United States Patent [19]
Hasegawa

[11] Patent Number: 5,707,193
[45] Date of Patent: Jan. 13, 1998

[54] SCREW-FITTING CLIP AND OBJECT-ENGAGING MECHANISM USING THE SAME

[75] Inventor: Maki Hasegawa, Aichi-ken, Japan

[73] Assignee: Aoyama Seisakusho Co., Ltd., Aichi-ken, Japan

[21] Appl. No.: 727,976

[22] Filed: Oct. 9, 1996

[30] Foreign Application Priority Data

Oct. 27, 1995 [JP] Japan .................................. 7-280013

[51] Int. Cl.⁶ .......................... F16B 37/08; F16B 37/16
[52] U.S. Cl. .................... 411/433; 411/437; 411/366; 411/527
[58] Field of Search .......................... 411/433, 437, 411/525, 526, 527, 222, 366

[56] References Cited

U.S. PATENT DOCUMENTS

| | | | |
|---|---|---|---|
| 2,969,705 | 1/1961 | Becker | 411/527 |
| 3,207,022 | 9/1965 | Tinnerman | 411/527 |
| 4,600,344 | 7/1986 | Sutenbach et al. | 411/437 X |
| 4,784,553 | 11/1988 | Spat | 411/437 X |
| 4,911,594 | 3/1990 | Fisher | 411/527 X |
| 5,190,424 | 3/1993 | Kazino et al. | |

FOREIGN PATENT DOCUMENTS

| | | | |
|---|---|---|---|
| 384923 | 9/1990 | European Pat. Off. | 411/437 |
| 267538 | 5/1989 | Germany | 411/437 |
| 6-129416 | 5/1994 | Japan | |
| 7-14650 | 4/1995 | Japan | |

OTHER PUBLICATIONS

Threads and Thread Ends for Tapping Screws; JIS B 1007; 1987; pp. 357–364.

*Primary Examiner*—Neill R. Wilson
*Attorney, Agent, or Firm*—Frishauf, Holtz, Goodman, Langer & Chick

[57] ABSTRACT

An object engaging mechanism includes a screw-fitting clip and a tapping screw to which said screw-fitting clip is to be fitted. The screw-fitting clip includes a plurality of elastic engaging claws protruding radially from an edge of a center hole of an annular disk at an inclined angle relative to a surface of the annular disk, and a plurality of protruding pieces arranged on an outer peripheral portion of the annular disk and extending away from the annular disk on a same side as the elastic engaging claws. The tapping screw comprises a plurality of ridges and has a thread profile such that a first side of the ridges facing a shank end of the tapping screw is an outwardly convex curved flank, and a second side of the ridges is a gently inwardly concave curved flank. The elastic engaging claws of the screw-fitting clip have tips which are formed with bent end portions corresponding to the thread profile of the tapping screw, and the screw-fitting clip and the tapping screw engage an object therebetween by a forcible pushing operation whereby the shank end of the tapping screw is inserted through the center hole of the annular disk of the screw-fitting clip until a bearing surface of the annular disk reaches the object to be engaged, and the tips of the elastic engaging claws of the screw-fitting clip are fitted between the ridges of the tapping screw against a base portion of the inwardly concave curved flank of the ridges.

11 Claims, 2 Drawing Sheets

SCREW-FITTING CLIP AND OBJECT-ENGAGING MECHANISM USING THE SAME

BACKGROUND OF THE INVENTION

This invention relates to a screw-fitting clip, i.e., a screw-fitting clip having a nut function by being fitted to a screw such as a bolt and a tapping screw to engage a member to be engaged between said screw and said screw-fitting clip, and an object-engaging mechanism using the screw-fitting clip.

As a partner member for engaging a member to be engaged by being fitted to a screw such as a bolt and a tapping screw, a nut has been generally used. However, in the case where engaging strength is not so required, when a nut is used, there are problems in that quality becomes excessive, increased time is required for an engaging operation, and in that the product becomes heavy. In the case where a member to be engaged is a fiber mat such as felt, engaging by a nut is carried out by rotational operation, so that excessive clamping occurs to cause a problem in that the fiber mat is squashed. In order to solve such a problem, in Japanese Provisional Patent Publication No. 129416/1994, there has been proposed a stopper for nut loosening, which is a member in which six stop-engaging claws of shapes that make two sides of isosceles triangles, are formed at the peripheral edge of an open hole by providing the open hole of a star shape or the like at the center portion of a base plate consisting of a steel plate equipped with elasticity, and at the same time these respective stop-engaging claws are protruded to one side surface of the base plate in a needle shape, which is designed so that by screwing said member to the shank of a bolt in a direction opposite to the protruding direction of the engaging claws, a stopping mechanism for loosening of a nut previously mounted is achieved. In such a stopper for nut loosening, the above problems, i.e., the problems of cost and heaviness which are caused when a nut is used cannot be solved. Further, there are problems in that a bolt is easily damaged by the triangular engaging claws of said stopper for nut loosening, and in that screw pitch is not taken into consideration, so that said stopper for nut loosening is easily inclined relative to an axis of a screw shank, whereby the member to be engaged very often cannot be fixed securely. Particularly when the screw is a tapping screw, such a case tends to occur significantly, and since the stopper is mounted on a screw shank by screwing, a problem of excessive clamping cannot be solved. Further, when the member to be engaged is a fiber mat such as felt, these same problems occur, and there are also problems in that the screwing operation takes time as in the case of a nut, a tool such as a torque wrench is required, and when an engagement is broken off, it is not easy to remove the stopper, so the entire operation takes much time, whereby the stopper cannot be used practically.

SUMMARY OF THE INVENTION

An object of the present invention is to provide a screw-fitting clip which can solve the above problems and can be mounted on a screw shank only by forcible pushing operation, so that clamping and loosening operations are easy, so that stable engagement can be effected and so that operation of braking off an engagement can be carried out easily, and an object-engaging mechanism using the screw-fitting clip.

In order to achieve the above objects, the invention comprises a screw-fitting clip in which three elastic engaging claws (2) protruding radially from the hole edge of a center hole (3) of an annular-disc (1) including an elastic steel plate toward the center of the hole and protruding with a certain inclination angle relative to the surface of said annular disc are arranged at the same intervals, wherein the tips of said elastic engaging claws are formed so that they correspond to the screw profile of a screw (S) to which said screw-fitting clip is to be fitted; and plural protruded pieces (4) for operation are provided at necessary positions of the outer peripheral portion of said annular disc toward the protruding direction of said elastic engaging claws. The above screw (S) is a tapping screw (based on JIS B 1007 as a whole), and the above tips of the elastic engaging claws (2) are formed so that they correspond to the screw profile of said screw and are bent at end portions (2a). claw pieces (5) protruding in a direction opposite to that of the above elastic engaging claws (2) are arranged at necessary positions of the annular disc (1). Further, an object-engaging mechanism is provided forcibly pushing the screw-fitting clip from the shank end of the above tapping screw (S) having a thread profile such that the side facing to the shank end is an outwardly convex curved flank and a side opposite thereto is a gently inwardly concave curved flank (with respect to details of the meanings of "an outwardly convex curved flank" and "an inwardly concave curved flank", see Japanese Registered Utility Model No. 2,090,552 and U.S. Pat. No. 5,190,424 corresponding to the former patent) so that the shank of said tapping screw is inserted through the above center hole (3) until the bearing surface of the above annular disc (1) reaches to a member to be engaged; and the respective claw ends of the above elastic engaging claws (2) fitted between the ridges of said tapping screw with the base portion of the inwardly concave curved flank of said ridges engage said member to be engaged between said screw and said screw-fitting clip.

DESCRIPTION OF THE PREFERRED EMBODIMENTS

Figure 1:
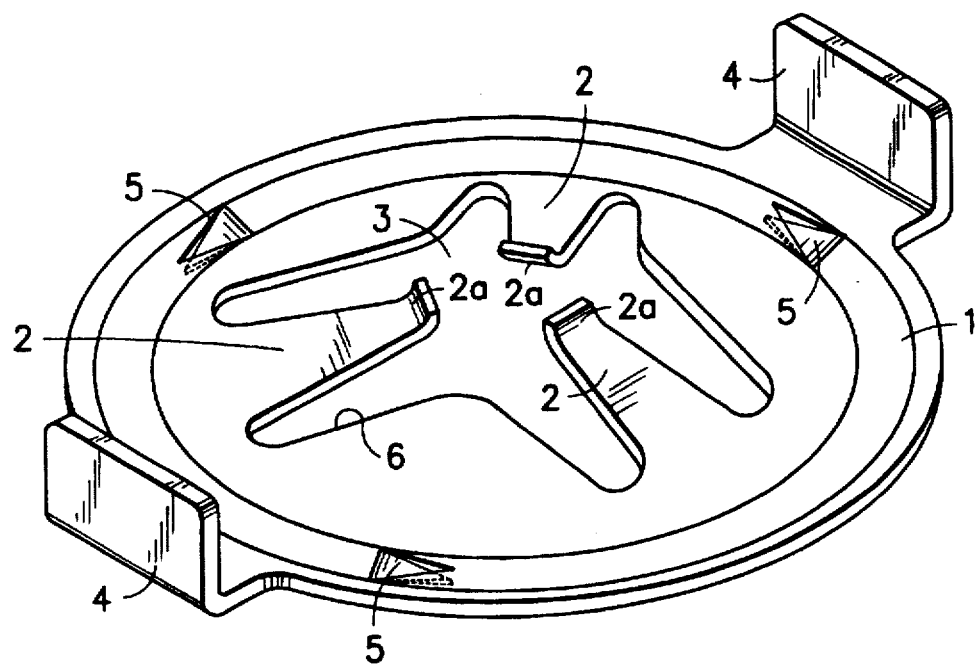
FIG. 1 is a perspective view showing one example of the preferred embodiment of the present invention.

Next, the preferred embodiment of the present invention is explained in detail by referring to the drawings.

FIG. 1 shows a screw-fitting clip for a tapping screw. (1) is an annular disc comprising an elastic steel plate (e.g. SUS304) and having a thickness of 0.5 mm. In the center of the annular disc (1), three elastic engaging claws (2) having excellent elasticity, formed by protruding three protruded pieces having slightly narrower ends from the hole edge of a center hole (3) in an inclined state from one surface of the annular disc (1) by press working are arranged at the same intervals. The reason why the number of the elastic engaging claws (2) is determined to be three is that if the number is more than that, the strength of said elastic engaging claws is weakened, so that desired engaging power can be obtained with difficulty, while if the number is less than that, a contact area of a tapping screw (S) and said elastic engaging claws is small, so that the tapping screw (S) is easily loosened.

Figure 2:
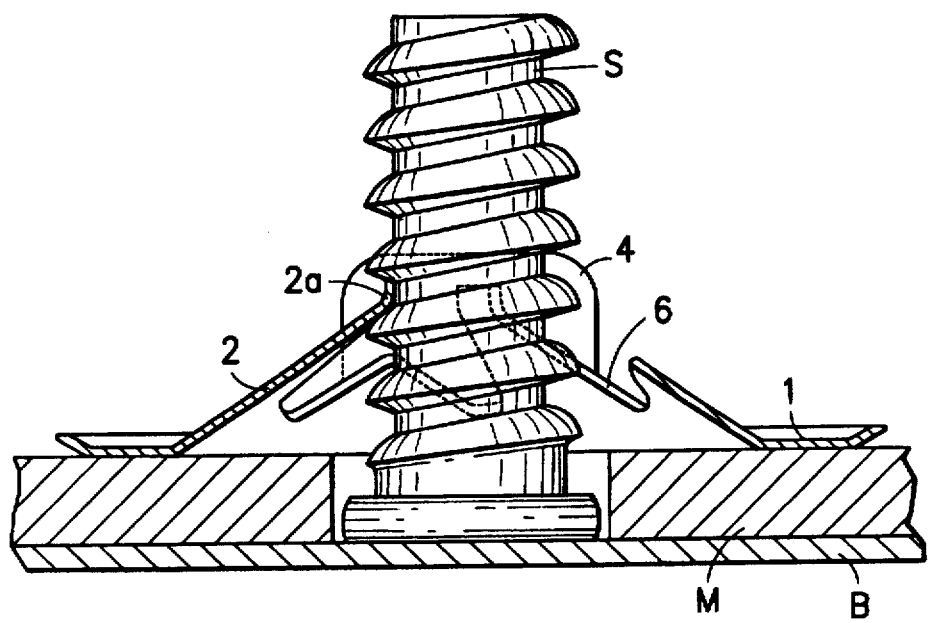
FIG. 2 is a sectional view showing one example of the preferred embodiment of the present invention in a used state.

The tips of the respective elastic engaging claws (2) correspond to the screw profile of the screw (S) so that they are particularly effective when the clip is a screw-fitting clip for a tapping screw, having a thread profile such that the side facing to a shank end is an outwardly convex curved flank and a side opposite thereto is a gently inwardly concave curved flank as shown in FIG. 2. That is, the tips of the respective elastic engaging claws (2) are slightly shifted in phase by length corresponding to the pitch of the screw (S) and are bent end portions (2a) having such a shape that when they are inserted between ridges, they correspond to the diameter of a screw shank and are easily engaged with the base portion of the above inwardly concave curved flank. The imaginal diameter of the center hole (3) made by connecting the respective bent end portions (2a) of these three elastic engaging claws (2) are made smaller than the screw diameter of the screw (S). It is required that the elastic engaging claws (2) have sufficient elasticity by which they can be fitted to the screw shank not by screwing but by forcible pushing. On this basis, a thickness and a material of the screw-fitting clip are decided. Further, at necessary positions of the outer peripheral portion of the annular disc (1), in order that the screw-fitting clip itself can be easily held by fingers and so that when the screw-fitting clip is removed from said screw, rotational operation can be carried out easily, plural square protruded pieces (4) for operation are provided toward the same side as the protruding direction of said elastic engaging claws and perpendicularly to the surface of the annular disc (1). Here, the ends of the protruded pieces (4) for operation may be further bent inwardly by 90°, which provides an operator with safety and measures for retaining the strength of said protruded pieces for operation. Also, plural claw pieces (5) protruding on a surface opposite to the surface where said elastic engaging claws of said annular disc are provided are arranged at the outer peripheral portion of said annular disc. The claw pieces (5) are arranged at intervals of 120° by punching with their ends being faced in a direction opposing to loosening of a screw, and have a function for fixing a member to be engaged and a function for stopping loosening of the annular disc (1). (6) is a punched hole formed as a result of forming the elastic engaging claws (2) by a punching method, and this punched hole acts as the so-called rib which suppresses deflection of the annular disc (1).

In the case of the screw-fitting clip thus constituted, as shown in FIG. 2, after a fiber mat (M) as a member to be engaged is set to a tapping screw as the screw (S) fixed to a base material (B), when the protruded pieces (4) for operation are held by fingers and forcibly pushed in a state that the respective elastic engaging claws (2) are protruded upward and put over the screw (S) from a shank end thereof, and the annular disc (1) is fitted so that said screw is inserted through the center hole (3) of said annular disc, since the diameter of said center hole of said elastic engaging claws is smaller than the screw diameter of said screw, when said elastic engaging claws touch the shank end of said screw, said center hole of said elastic engaging claws which are inclined upward is deformed in such a direction that its diameter becomes larger, so that due to elasticity thereof, said elastic engaging claws get over the ridges of said screw one after another while said elastic engaging claws touch them, and finally, the fiber mat (M) as a member to be engaged is pressed and fixed by the bearing surface of said annular disc. At this time, as shown in FIG. 2, the tips which are slightly bent upward of the respective elastic engaging claws (2) are bent end portions (2) which correspond to the screw profile of the screw (S), and also said elastic engaging claws themselves are deformed elastically, so that they are engaged forcibly in a state that they touch the base portion of the inwardly concave curved flank of the ridges along the root of said screw, whereby although the screw is a tapping screw, .the member to be engaged can be fixed precisely and stably.

Further, the respective three elastic engaging claws (2) are arranged at intervals of 120° so that the tips thereof are not faced mutually, whereby when the respective elastic engaging claws (2) are engaged with the ridges of the screw (S), the annular disc (1) is not inclined largely due to difference in pitch of the screw, and engagement failure is not caused. When the fiber mat (M) is removed, by rotating said annular disc in a screw-loosening direction by holding the square protruded pieces (4) for operation protruded perpendicularly at the outer peripheral portion of said annular disc, engagement of the tips of the elastic engaging claws (2) with the base portion of the inwardly concave curved flank of the ridges of the screw is easily broken off, so that this removing operation does not take time. Further, when the plural claw pieces (5) arranged so that they are protruded in a direction opposite to that of the elastic engaging claws (2) of the annular disc (1) are arranged at intervals of 120° by punching with their tips being faced toward a direction opposing to loosening of a screw, the claw pieces (5) have a function for fixing a member to be engaged and also has a function for stopping loosening of the annular disc (1).

Figure 3:
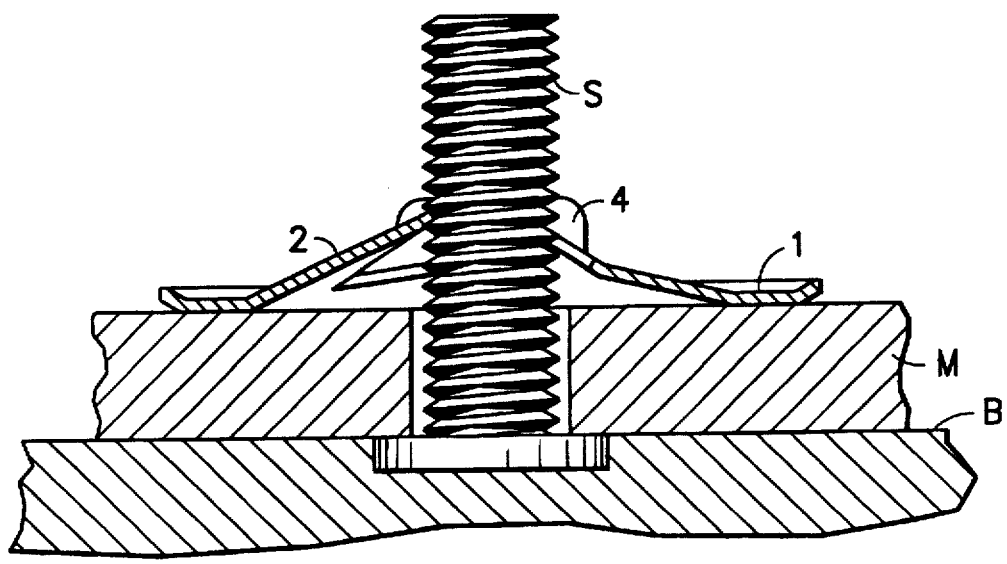
FIG. 3 is a sectional view showing another example of the preferred embodiment of the present invention in a used state.

Next, FIG. 3 shows another example of an embodiment of the present invention, and the point which is different from the above embodiment resides in that since the clip is a common bolt-fitting clip, the tips of the elastic engaging claws (2) are not bent end portions corresponding to the screw profile of the tapping screw (S), but are straight so that they can correspond to the screw profile of a common bolt. This embodiment is the same as the embodiment shown in FIG. 2 except for the above point, and the action and effect thereof are also the same as those of the embodiment in FIG. 2, so that the same numeral references are given and explanation is omitted.

As clearly seen from the above description, in the present invention, elastic engaging claws protruding radially from the hole edge of a center hole of an annular disc comprising an elastic steel plate toward the center of the hole and protruding with a certain inclination angle relative to the surface of said annular disc have sufficient elasticity by which they can be mounted on a screw shank by a forcible pushing operation, and also the number of the elastic engaging claws is three, so that a screw-fitting clip can be mounted easily only by the forcible pushing operation without screwing by using a special tool; when the screw-fitting clip is fitted, the screw shank is not damaged; and there is no possibility that the annular disc is inclined because the elastic engaging claws are engaged with ridges at difference in pitch intervals, whereby secure fixing of a member to be engaged can be carried out. Moreover, plural protruded pieces for operation are provided at positions of the outer peripheral portion of the annular disc toward the protruding direction of the elastic engaging claws, so that by utilizing these protruded pieces for operation, a member to be engaged can be easily removed. Further, engagement can be carried out by a forcible pushing operation, so that there are various advantages such that fixing of a member to be engaged can be carried out by one touch; and even when a member to be engaged is a fiber mat such as felt, functions such as a buffer effect and a heat insulation effect are not impaired by squashing.

I claim:

1. An object engaging mechanism comprising a screw-fitting clip and a tapping screw to which said screw-fitting clip is to be fitted, wherein:

said screw-fitting clip comprises a plurality of elastic engaging claws protruding radially from an edge of a center hole of an annular disk at an inclined angle relative to a surface of said annular disk, and a plurality of protruding pieces arranged on an outer peripheral portion of said annular disk and extending away from said annular disk on a same side as said elastic engaging claws;

said tapping screw comprises a plurality of ridges and has a thread profile such that a first side of said ridges facing a shank end of said tapping screw is an outwardly convex curved flank, and a second side of said ridges is a gently inwardly concave curved flank;

said elastic engaging claws of said screw-fitting clip have tips which are formed with bent end portions corresponding to said thread profile of said tapping screw; and said screw-fitting clip and said tapping screw engage an object therebetween by a forcible pushing operation whereby said shank end of said tapping screw is inserted through said center hole of said annular disk of said screw-fitting clip until a bearing surface of said annular disk reaches the object to be engaged, and said tips of said elastic engaging claws of said screw-fitting clip are fitted between said ridges of said tapping screw against a base portion of said inwardly concave curved flank of said ridges.

2. The object engaging mechanism according to claim 1, wherein said elastic engaging claws are three in number and are spaced apart from each other on said annular disk at 120 degree intervals.

3. The object engaging mechanism according to claim 1, wherein said elastic engaging claws are formed to be narrower at ends thereof toward said center hole of said annular disk.

4. The object engaging mechanism according to claim 1, wherein said protruding pieces are two in number and include end portions extending perpendicularly to said annular disk.

5. The object engaging mechanism according to claim 1, wherein said screw-fitting clip comprises an elastic steel material.

6. An object engaging mechanism comprising a screw-fitting clip and a tapping screw to which said screw-fitting clip is to be fitted, wherein:

said screw-fitting clip comprises a plurality of elastic engaging claws protruding radially from an edge of a center hole of an annular disk at an inclined angle relative to a surface of said annular disk, a plurality of protruding pieces arranged on an outer peripheral portion of said annular disk and extending away from said annular disk on a same side as said elastic engaging claws, and a plurality of claw pieces arranged on said annular disk and extending away from said annular disk on an opposite side as said elastic engaging claws and said protruding pieces;

said tapping screw comprises a plurality of ridges and has a thread profile such that a first side of said ridges facing a shank end of said tapping screw is an outwardly convex curved flank, and a second side of said ridges is a gently inwardly concave curved flank;

said elastic engaging claws of said screw-fitting clip have tips which are formed with bent end portions corresponding to said thread profile of said tapping screw; and said screw-fitting clip and said tapping screw engage an object therebetween by a forcible pushing operation whereby said shank end of said tapping screw is inserted through said center hole of said annular disk of said screw-fitting clip until a bearing surface of said annular disk reaches the object to be engaged, and said tips of said elastic engaging claws of said screw-fitting clip are fitted between said ridges of said tapping screw against a base portion of said inwardly concave curved flank of said ridges.

7. The object engaging mechanism according to claim 6, wherein said elastic engaging claws are three in number and are spaced apart from each other on said annular disk at 120 degree intervals.

8. The object engaging mechanism according to claim 6, wherein said elastic engaging claws are formed to be narrower at ends thereof toward said center hole of said annular disk.

9. The object engaging mechanism according to claim 6, wherein said protruding pieces are two in number and include end portions extending perpendicularly to said annular disk.

10. The object engaging mechanism according to claim 6, wherein said screw-fitting clip comprises an elastic steel material.

11. The object engaging mechanism according to claim 6, wherein said claw pieces are three in number and are spaced apart from each other on said annular disk at 120 degree intervals.

* * * * *